(12) United States Patent
Okada et al.

(10) Patent No.: US 9,536,677 B2
(45) Date of Patent: Jan. 3, 2017

(54) DYE-SENSITIZED SOLAR CELL AND METHOD FOR MANUFACTURING SAME

(71) Applicant: FUJIKURA LTD., Koto-ku, Tokyo (JP)

(72) Inventors: Kenichi Okada, Chiba (JP); Katsuhiro Doi, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/143,386

(22) Filed: Dec. 30, 2013

(65) Prior Publication Data
US 2014/0109969 A1    Apr. 24, 2014

Related U.S. Application Data

(63) Continuation of application No. PCT/JP2012/066372, filed on Jun. 27, 2012.

(30) Foreign Application Priority Data

Jun. 30, 2011 (JP) ................................ 2011-146389

(51) Int. Cl.
*H01L 31/0203* (2014.01)
*H01G 9/20* (2006.01)

(52) U.S. Cl.
CPC .......... *H01G 9/2077* (2013.01); *H01G 9/2031* (2013.01); *H01G 9/2059* (2013.01); *Y02E 10/542* (2013.01); *Y02P 70/521* (2015.11)

(58) Field of Classification Search
CPC ... H01L 31/0203; H01L 51/44; H01G 9/2077; H01G 9/2004; H01G 9/2022; H01G 9/2031; H01G 9/2059; H01G 9/2027
(Continued)

(56) References Cited

U.S. PATENT DOCUMENTS

| 2011/0192458 A1* | 8/2011 | Doi ...................... H01G 9/2004 136/256 |
| 2011/0223704 A1* | 9/2011 | Doi ...................... H01G 9/2077 438/64 |

FOREIGN PATENT DOCUMENTS

| EP | 2 352 200 | 8/2011 |
| EP | 2403052 | 1/2012 |

(Continued)

OTHER PUBLICATIONS

Japanese Office Action issued Sep. 2, 2014 in Japanese Patent Application No. 2013-522892.
(Continued)

*Primary Examiner* — Jayne Mershon
(74) *Attorney, Agent, or Firm* — Sughrue Mion, PLLC

(57) ABSTRACT

A dye-sensitized solar cell includes a first electrode; a second electrode that faces the first electrode; an electrolyte that is disposed between the first electrode and the second electrode; and an annular encapsulation unit that surrounds the electrolyte together with the first electrode and the second electrode, and connects the first electrode and the second electrode. In the dye-sensitized solar cell, the sealing portion has a resin sealing section formed of a resin. At least one interface of a first interface between the first electrode and the sealing portion, and a second interface between the second electrode and the sealing portion, constitutes a wide width section having the broadest sealing width among the sealing widths of the sealing portion, and the sealing portion has a narrow width section having a narrower sealing width than the wide width section.

7 Claims, 10 Drawing Sheets

(58) Field of Classification Search
USPC .................................................. 136/251, 263
See application file for complete search history.

(56) References Cited

FOREIGN PATENT DOCUMENTS

| | | | |
|---|---|---|---|
| JP | 2006-100069 | A | 4/2006 |
| JP | 2009-094019 | A | 4/2009 |
| JP | 2009-266616 | A | 11/2009 |
| JP | 2009-277399 | * | 11/2009 |
| JP | 2009-277399 | A | 11/2009 |
| JP | 2010-003556 | A | 1/2010 |
| JP | 2010-003557 | A | 1/2010 |
| JP | 2010-040432 | | 2/2010 |
| JP | 2010-198836 | | 9/2010 |
| JP | 2011-040361 | | 2/2011 |
| WO | 2010/050207 | | 5/2010 |
| WO | 2011/013423 | | 2/2011 |

OTHER PUBLICATIONS

Supplementary European Search Report issued Jun. 18, 2015 in European Patent Application No. 12804545.7.
Chinese Office Action issued Oct. 10, 2015 in Chinese Patent Application No. 201280023914.9.

* cited by examiner

US 9,536,677 B2

DYE-SENSITIZED SOLAR CELL AND METHOD FOR MANUFACTURING SAME

CROSS REFERENCE TO RELATED APPLICATIONS

This application is a Continuation of National Stage of International Application No. PCT/JP2012/66372 filed Jun. 27, 2012, claiming priority based on Japanese Patent Application No. 2011-146389 filed Jun. 30, 2011, the contents of all of which are incorporated herein by reference in their entirety.

TECHNICAL FIELD

The present invention relates to a dye-sensitized solar cell and a method for producing the same.

BACKGROUND ART

Attention has been paid to dye-sensitized solar cells as photo-electric conversion elements since high photo-electric conversion efficiency can be obtained at low cost. Thus, various developments have been implemented in relation to dye-sensitized solar cells.

A dye-sensitized solar cell generally includes a working electrode, a counter electrode, a photo-sensitizing dye that is supported on an oxide semiconductor layer of the working electrode, an electrolyte that is disposed between the working electrode and the counter electrode, and a sealing portion that connects the working electrode and the counter electrode.

Regarding such a dye-sensitized solar cell, for example, there is known a dye-sensitized solar cell described in Patent Document 1 described below. Patent Document 1 described below discloses a dye-sensitized solar cell which includes a working electrode having a transparent electrode formed on a first thin sheet glass, and a porous membrane formed on the transparent electrode; a counter electrode formed on a second thin sheet glass; an electrolytic solution disposed between the working electrode and the counter electrode; a sealing portion that seals the electrolytic solution between the working electrode and the counter electrode; and a wiring material protruding from the working electrode into the sealing portion. Here, the sealing width of the sealing portion is constant between the working electrode and the counter electrode.

CITATION LIST

Patent Document

Patent Document 1: JP 2009-94019 A (FIG. 1)

SUMMARY OF THE INVENTION

Problem to be Solved by the Invention

However, in the dye-sensitized solar cell described in Patent Document 1 mentioned above, it still cannot be said that the change over time in the photo-electric conversion characteristics are sufficiently small. For this reason, the dye-sensitized solar cell described in Patent Document 1 has room for an improvement in terms of durability.

The present invention was achieved in view of such circumstances, and an object of the present invention is to provide a dye-sensitized solar cell having excellent durability and a method for producing the same.

Means for Solving the Problem

The inventors of the present invention conducted an investigation on the cause of the occurrence of the problems described above. First, in the dye-sensitized solar cell of Patent Document 1, the sealing width of the sealing portion is constant between the working electrode and the counter electrode. However, in reality, when a working electrode and a counter electrode are bonded together by means of a sealing portion, the sealing portion is heated while pressure is applied thereto. As a result, the inventors of the present invention noticed that the dye-sensitized solar cell thus obtainable tends to be such that the inner circumferential surface of the sealing portion protrudes to be convex toward the electrolyte side, and the outer circumferential surface of the sealing portion overhangs to be convex toward the opposite side of the electrolyte. That is, the inventors noticed that there is a tendency that a site that is wider than the respective sealing widths at the interface between the sealing portion and the working electrode and at the interface between the sealing portion and the counter electrode, is formed in the sealing portion. Furthermore, at this time, the inventors noticed that a wedge-shaped narrow gap is also formed by the inner circumferential surface of the sealing portion and the surface on the electrolyte side of the counter electrode as well as a wedge-shaped narrow gap is formed by the inner circumferential surface of the sealing portion and the surface on the electrolyte side of the working electrode. Then, the inventors contemplated that when a dye-sensitized solar cell is used in a high temperature environment, the electrolyte that has penetrated into the wedge-shaped narrow gap expands, and stress is concentrated at the gap, so that the sealing portion could be detached from the working electrode or the counter electrode, or the sealing portion could be destroyed, from that site as a starting point, causing leakage of the electrolyte. The inventors speculated that thereby, the dye-sensitized solar cell described in Patent Document 1 may have insufficient durability. Thus, the inventors of the present invention further conducted thorough investigations, and as a result, the inventors speculated that stress is concentrated at the interface between the sealing portion and the working electrode or the counter electrode (electrode) because as the sealing portion is compressed, the sealing width at the interface between the sealing portion and the electrode could become narrowest within the sealing portion. Thus, the inventors found that the problems described above can be solved by the following invention.

That is, the present invention is a dye-sensitized solar cell including a first electrode; a second electrode that faces the first electrode; an electrolyte that is disposed between the first electrode and the second electrode; and an annular encapsulation unit that surrounds the electrolyte together with the first electrode and the second electrode, and connects the first electrode and the second electrode, in which cell the sealing portion has a resin sealing section formed of a resin, at least one interface of a first interface between the first electrode and the sealing portion and a second interface between the second electrode and the sealing portion has a wide width section having the broadest sealing width among the sealing widths of the sealing portion, and the sealing portion has a narrow width section having a narrower sealing width than the wide width section.

In this dye-sensitized solar cell, at least one interface of the first interface between the first electrode and the sealing portion and the second interface between the second electrode and the sealing portion has a wide width section having the broadest sealing width among the sealing widths of the sealing portion, and the sealing portion has a narrow width section having a narrower sealing width than the wide width section. That is, basically, the inner circumferential surface of the sealing portion does not protrude to be convex toward the electrolyte side, and a wedge-shaped narrow gap is not formed by the surface on the electrolyte side of at least one of the first electrode and the second electrode, and the inner circumferential surface of the sealing portion. Furthermore, since the sealing portion has a narrow width section having a narrower sealing width than the wide width section, even in the case where the inner circumferential surface of the sealing portion protrudes to be convex toward the electrolyte side due to stress from the outside or the like, this narrow width section is more susceptible to deformation than the interface, and the sealing portion can absorb stress by being deformed. Therefore, due to stress from the outside or the like, when the inner circumferential surface of the sealing portion protrudes to be convex toward the electrolyte side, even if the dye-sensitized solar cell is used in a high temperature environment and thus the electrolyte expands, concentration of stress at the interface between at least one of the first electrode and the second electrode and the sealing portion can be suppressed.

As discussed above, according to the dye-sensitized solar cell of the present invention, detachment of the sealing portion from the first electrode or the second electrode or destruction of the sealing portion, which causes leakage of the electrolyte, is sufficiently suppressed. Therefore, the dye-sensitized solar cell of the present invention can have excellent durability.

In the dye-sensitized solar cell described above, it is preferable that the inner circumference at the wide width section be on the inner side than the narrow width section.

In this case, as compared with the case where the inner circumference at the wide width section is not on the inner side than the narrow width section, the formation of a wedge-shaped narrow gap by the surface on the electrolyte side of at least one of the first electrode and the second electrode and the inner circumferential surface of the sealing portion, is more satisfactorily prevented. For this reason, detachment of the sealing portion caused by stress concentration at the gap, or leakage of the electrolyte is more satisfactorily suppressed.

In the dye-sensitized solar cell, it is preferable that an inorganic sealing section formed of an inorganic material be provided on at least one electrode of the first electrode and the second electrode, and within the sealing portion.

In this case, the inorganic sealing section is provided on at least one electrode of the first electrode and the second electrode, and within the sealing portion. Therefore, even if stress in a direction that heads for the opposite side of the electrolyte is applied to the sealing portion for the reason that the dye-sensitized solar cell is placed in a high temperature environment, and the electrolyte expands, migration of the sealing portion is sufficiently suppressed by the inorganic sealing section. Furthermore, even if the sealing portion is compressed, the pressure that is applied to the narrow width section is not easily transferred to a connection section that connects the narrow width section and the wide width section by the inorganic sealing section. For this reason, it is difficult for the inner circumferential surface of the sealing portion to protrude to be convex toward the electrolyte side, and it is more difficult for a wedge-shaped narrow gap to be formed. Therefore, stress concentration at the interface can be more satisfactorily suppressed. Furthermore, when the dye-sensitized solar cell is placed in a high temperature environment, fluidity of the resin sealing section increases. At this time, when an excessively high pressure is applied to the sealing portion in the height direction, if an inorganic sealing section is provided within the sealing portion, for example, even if the first electrode comes closer to the second electrode, it can be sufficiently suppressed by the inorganic sealing section that the first electrode is brought into contact with the second electrode, and short-circuit between the first electrode and the second electrode can be sufficiently suppressed. Furthermore, since the inorganic sealing section has higher encapsulation performance than the resin sealing section, when the sealing portion includes the inorganic sealing section, the encapsulation performance of the sealing portion is further enhanced.

The inorganic sealing section preferably includes a main body section that is provided on at least one electrode of the first electrode and the second electrode; and a decreasing-thickness section that is provided on the electrolyte side or the side opposite to the electrolyte with respect to the main body section, and has a thickness that decreases as the decreasing-thickness section is separated farther apart from the main body section.

In this case, even if the thickness of the resin sealing section between the main body section of the inorganic sealing section and the electrode that faces the main body section is small, and sufficient adhesiveness is not obtained, a decreasing-thickness section is provided on the electrolyte side or the side opposite to the electrolyte with respect to the main body section. Therefore, the thickness of the resin sealing section increases as the resin sealing section is separated farther apart from the main body section. For this reason, sufficient adhesive power can be secured by the resin sealing section between the decreasing-thickness section and the second electrode. As a result, a dye-sensitized solar cell having superior durability can be realized.

Furthermore, it is preferable that the sealing portion further include a first connection section that connects the interface between the narrow width section and the first interface, and a second connection section that connects the narrow width section and the second interface, and grooves be formed on the inner circumferential surface of the sealing portion by the first connection section, the narrow width section, and the second connection section.

In this case, even if the sealing portion is compressed as a result of a stress that brings the first electrode and the second electrode into contact being applied, the narrow width section, the first connection section and the second connection section are likely to protrude toward the grooves. That is, it is more difficult for the inner circumferential surface of the first connection section and the inner circumferential surface of the second connection section to protrude toward the electrolyte side. For this reason, it is more difficult for a wedge-shaped narrow gap to be formed between the inner circumferential surface of the first connection section and the first electrode, and between the inner circumferential surface of the second connection section and the second electrode. Therefore, stress concentration at the interface between the first electrode and the first connection section as well as the interface between the second electrode and the second connection section can also be further suppressed. Therefore, detachment of the sealing portion from the first electrode and the second electrode or destruction of the sealing portion, which causes leakage of the electrolyte, is more satisfactorily suppressed. Therefore, the dye-sensitized solar cell of the present invention can have superior durability.

In the dye-sensitized solar cell described above, the sealing portion may have a connection section that connects the narrow width section and the first interface, and the narrow width section may be directly connected to the second electrode, so that grooves may be formed on the inner circumferential surface of the sealing portion by the connection section, the narrow width section, and the second electrode.

Even in this case, since stress concentration at the interface between the first electrode and the first connection section can be sufficiently suppressed, the dye-sensitized solar cell can have excellent durability.

Furthermore, the present invention is a method for producing a dye-sensitized solar cell, the method including a preparation step of preparing a first electrode or a second electrode; a sealing material fixing step of fixing a sealing material that forms a sealing portion that connects the first electrode and the second electrode; an electrolyte disposing step of disposing an electrolyte on the first electrode or the second electrode, and a bonding step of bonding the first electrode and the second electrode, and forming the sealing portion containing the sealing material between the first electrode and the second electrode, in which method the sealing portion is formed so as to have at least one interface of the first interface between the first electrode and the sealing portion, and the second interface between the second electrode and the sealing portion, as a wide width section having the broadest sealing width among the sealing widths of the sealing portion, and to have a narrow width section having a narrower sealing width than the wide width section.

In this production method, the following effects are obtained in connection with the dye-sensitized solar cell thus obtainable. That is, in the dye-sensitized solar cell obtainable according to the production method described above, basically, the inner circumferential surface of the sealing portion does not protrude to be convex toward the electrolyte side, and a wedge-shaped narrow gap is not formed by at least one of the first electrode and the second electrode and the inner circumferential surface of the sealing portion. Furthermore, since the sealing portion has a narrow width section having a narrower sealing width than the wide width section, even in the case where the inner circumferential surface of the sealing portion protrudes to be convex toward the electrolyte side due to stress from the outside or the like, this narrow width section is more susceptible to deformation than the interface, and the sealing portion can absorb stress by being deformed. For this reason, due to stress from the outside or the like, when the inner circumferential surface of the sealing portion protrudes to be convex toward the electrolyte side, even if the dye-sensitized solar cell is used in a high temperature environment and the electrolyte expands, concentration of stress at the interface between at least one of the first electrode and the second electrode and the sealing portion can be suppressed.

As discussed above, according to the production method of the present invention, detachment of the sealing portion from the first electrode or the second electrode or destruction of the sealing portion, which causes leakage of the electrolyte, is sufficiently suppressed, and a dye-sensitized solar cell having excellent durability can be obtained.

In the production method described above, it is preferable that the sealing portion be formed such that an inorganic sealing section formed from an inorganic material is provided on at least one electrode of the first electrode and the second electrode, and within the sealing portion.

In this case, the following effects can be obtained in connection with the dye-sensitized solar cell thus obtainable. That is, the inorganic sealing section is provided on at least one electrode of the first electrode and the second electrode, and within the sealing portion. Therefore, even if stress in a direction that heads for the opposite side of the electrolyte is applied to the sealing portion for the reason that the dye-sensitized solar cell is placed in a high temperature environment and the electrolyte expands, migration of the sealing portion is sufficiently suppressed by the inorganic sealing section. Furthermore, even if the sealing portion is compressed, the pressure that is applied to the sealing portion is not easily transferred by the inorganic sealing section to the connection section that connects the narrow width section and the wide width section. For this reason, it is difficult for the sealing portion to protrude to be convex toward the electrolyte side, and it is more difficult for a wedge-shaped narrow gap to be formed. Therefore, stress concentration at the interface can be more satisfactorily suppressed. Furthermore, when the dye-sensitized solar cell is placed in a high temperature environment, fluidity of the resin sealing section increases. At this time, when an excessively high pressure is applied to the sealing portion in the height direction, if an inorganic sealing section is provided within the sealing portion, for example, even if the first electrode is brought closer to the second electrode, it can be sufficiently suppressed by the inorganic sealing section that the first electrode is brought into contact with the second electrode, and short-circuit between the first electrode and the second electrode can be sufficiently suppressed.

Furthermore, since the inorganic sealing section has higher encapsulation performance than the resin sealing section, when the sealing portion includes the inorganic sealing section, the encapsulation performance of the sealing portion is further enhanced.

Effect of the Invention

According to the present invention, a dye-sensitized solar cell having excellent durability, and a method for producing the same are provided.

EMBODIMENTS FOR CARRYING OUT THE INVENTION

Hereinafter, embodiments of the present invention will be described in detail with reference to the drawings. Furthermore, in all of the diagrams, the same symbols will be assigned to identical or equivalent constituent elements, while any overlapping explanations will not be repeated.

Figure 1:
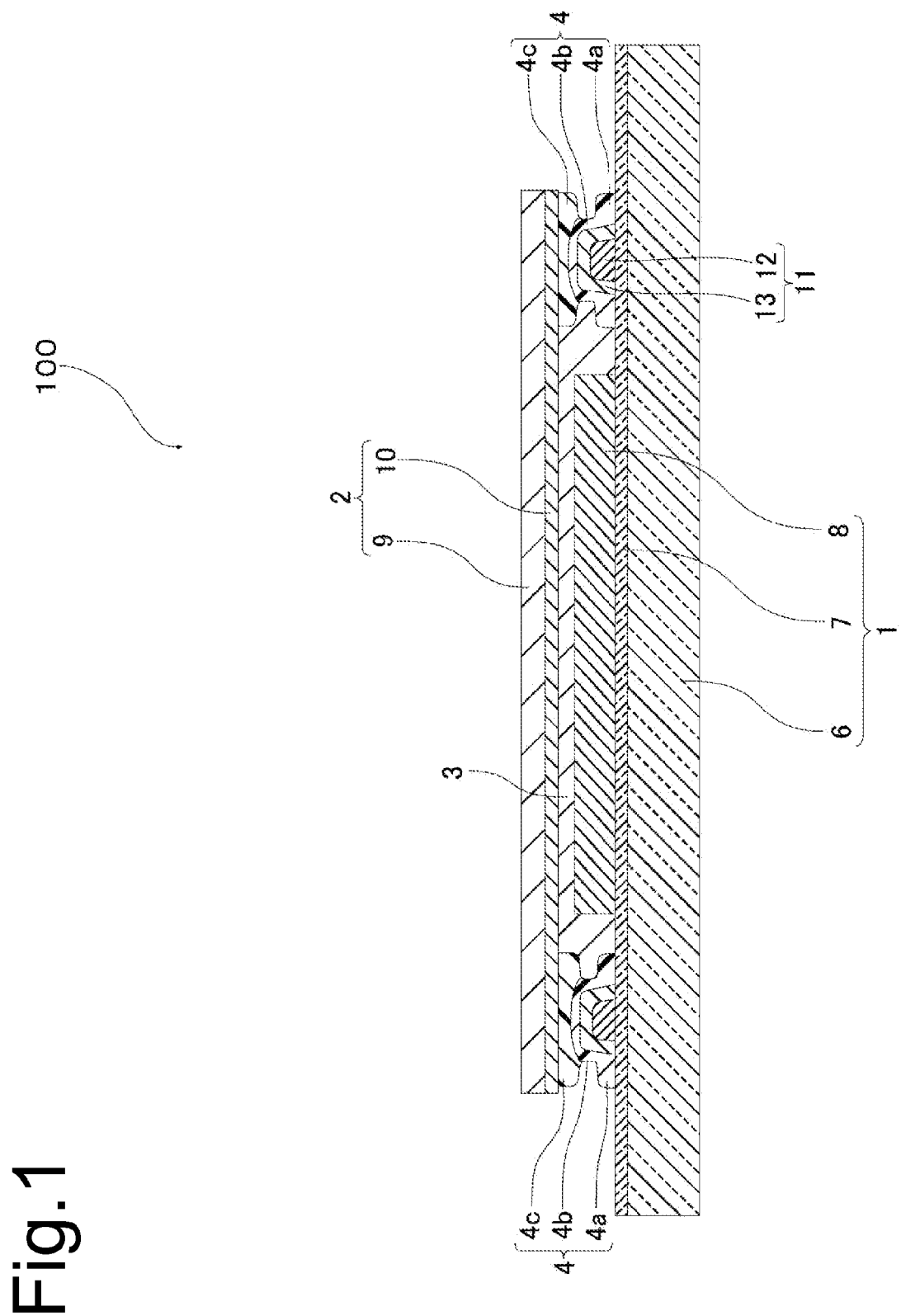
FIG. 1 is a cross-sectional diagram illustrating an embodiment of the dye-sensitized solar cell of the present invention.
Figure 2:
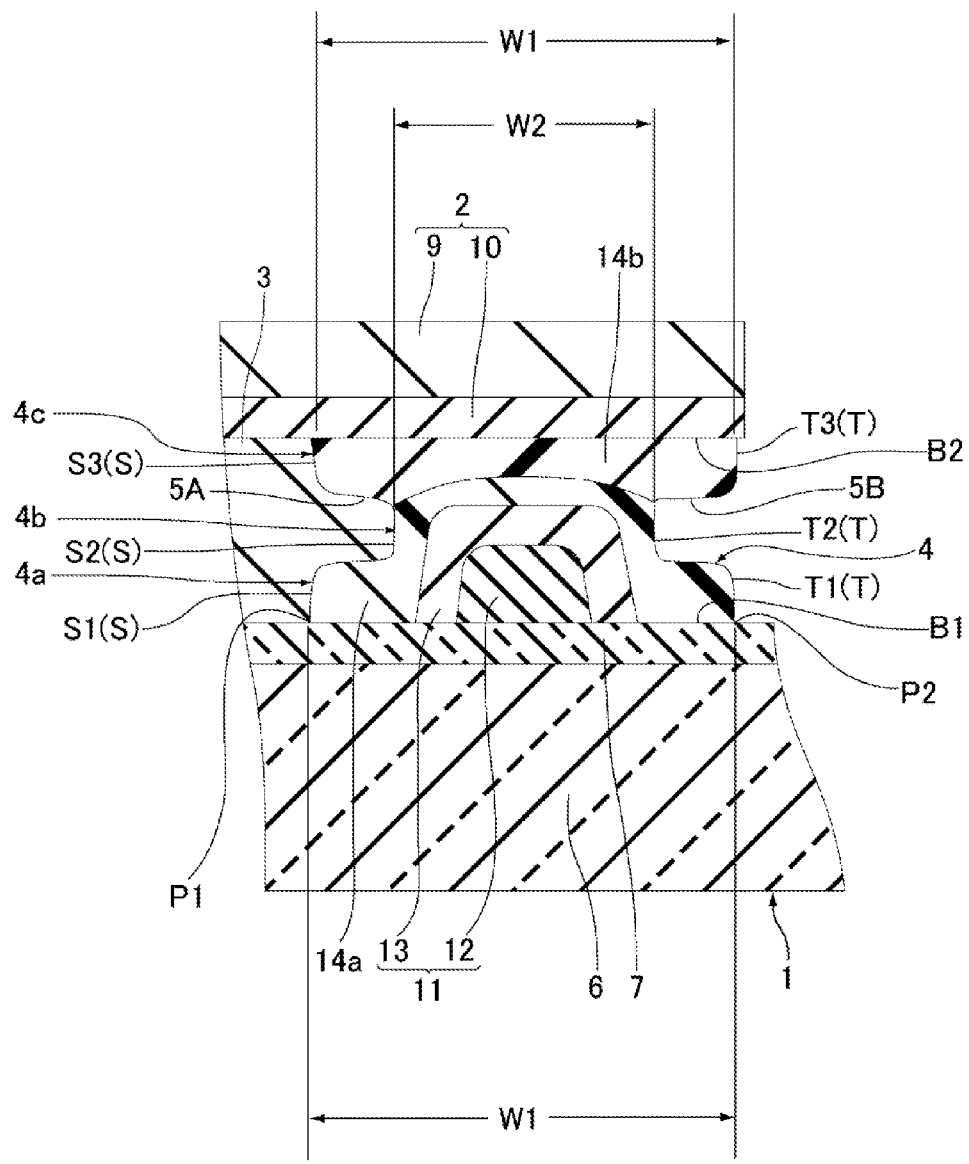
FIG. 2 is a partial cross-sectional diagram of FIG. 1.

FIG. 1 is a cross-sectional diagram illustrating a preferred embodiment of the dye-sensitized solar cell according to the present invention, and FIG. 2 is a magnified partial cross-sectional diagram of FIG. 1. As illustrated in FIG. 1, a dye-sensitized solar cell 100 includes a working electrode (first electrode) 1; a counter electrode (second electrode) 2 that is disposed to face the working electrode 1; an electrolyte 3 that is disposed between the working electrode 1 and the counter electrode 2; and an annular encapsulation unit 4 that surrounds the electrolyte 3 together with the working electrode 1 and counter electrode 2.

The working electrode 1 includes a transparent substrate 6; a transparent conductive film 7 that is provided on the counter electrode 2 side of the transparent substrate 6; and a porous oxide semiconductor layer 8 that is provided on the surface of the transparent conductive film 7. The porous oxide semiconductor layer 8 has a photosensitizing dye supported thereon.

The counter electrode 2 is composed of a counter electrode substrate 9, and a catalyst layer 10 that is provided thereon and is provided at a position that is in contact with the electrolyte 3. The counter electrode substrate 9 is disposed on the side opposite to the electrolyte 3 with respect to the catalyst layer 10.

As illustrated in FIG. 2, the sealing portion 4 includes an interface (first interface) B1 between the working electrode 1 and the sealing portion 4, and an interface (second interface) B2 between the counter electrode 2 and the sealing portion 4. Here, in the sealing portion 4, both the interface B1 and the interface B2 constitute a wide width section that has the broadest sealing width W1 among the sealing widths of the sealing portion 4. Further, the sealing portion 4 includes a narrow width section 4b that is provided between the interface B1 and the interface B2 and has a narrower sealing width W2 than the wide width section; a first connection section 4a that connects the interface B1 and the narrow width section 4b; and a second connection section 4c that connects the narrow width section 4b and the interface B2. Furthermore, a wiring section 11 is provided on the surface of the working electrode 1 and within the sealing portion 4. The wiring section 11 is composed of a power collection wiring 12 that is provided on the transparent conductive film 7 of the working electrode 1, and a wiring protective layer 13 that protects the power collection wiring 12. The sealing portion 4 includes a wiring section 11, a resin sealing section 14a that covers the wiring section 11 and is formed from a resin; and a resin sealing section 14b that bonds the resin sealing section 14a and the counter electrode 2.

The inner circumferential surface S1 of the first connection section 4a and the inner circumferential surface S3 of the second connection section 4c are provided to be inner side than the inner circumferential surface S2 of the narrow width section 4b. That is, on the inner circumferential surface S of the sealing portion 4, a groove 5A is formed by the first connection section 4a, the narrow width section 4b, and the second connection section 4c. Furthermore, the outer circumferential surface T1 of the first connection section 4a and the outer circumferential surface T3 of the second connection section 4c are provided to be outer than the outer circumferential surface T2 of the narrow width section 4b. That is, on the outer circumferential surface T of the sealing portion 4, a groove 5B is formed by the first connection section 4a, the narrow width section 4b, and the second connection section 4c. Furthermore, in the dye-sensitized solar cell 100, the inner circumference P1 in the wide width section is positioned to be inner side than the narrow width section 4b, and the outer circumference P2 in the wide width section is positioned outer than the narrow width section 4b. Here, the term "inner" means the side of the porous oxide semiconductor layer 8, and the term "outer" means the opposite side of the porous oxide semiconductor layer 8.

In this dye-sensitized solar cell 100, both the interface B1 between the working electrode 1 and the sealing portion 4, and the interface B2 between the counter electrode 2 and the sealing portion 4 constitute the wide width section having the broadest sealing width W1 among the sealing widths of the sealing portion 4, and the sealing portion 4 has a narrow width section having a narrower sealing width W2 than the wide width section. That is, basically, the inner circumferential surface S of the sealing portion 4 does not protrude to be convex toward the electrolyte 3 side, and a wedge-shaped narrow gap is not formed by the surface of the working electrode 1 and the inner circumferential surface S of the sealing portion 4. Similarly, a wedge-shaped narrow gap is also not formed by the surface of the counter electrode 2 and the inner circumferential surface S of the sealing portion 4. Furthermore, since the sealing portion 4 has a narrow width section 4b having a narrower sealing width W2 than the wide width section, even in the case where the inner circumferential surface S of the capsulation unit 4 protrudes to be convex toward the electrolyte 3 side due to stress from the outside or the like, this narrow width section 4b is more susceptible to deformation than the interfaces B1 and B2, and the sealing portion can absorb stress by being deformed. For this reason, when the inner circumferential surface S of the sealing portion 4 protrudes to be convex toward the electrolyte 3 side due to stress from the outside or the like, even if the dye-sensitized solar cell 100 is used in a high temperature environment and the electrolyte 3 expands, the concentration of stress at the interfaces B1 and B2 can be suppressed.

As discussed above, according to the dye-sensitized solar cell 100, detachment of the sealing portion 4 from the working electrode 1 or the counter electrode 2 or destruction of the sealing portion 4, which causes leakage of the electrolyte 3, is sufficiently suppressed. Therefore, the dye-sensitized solar cell 100 acquires excellent durability.

Particularly, in the dye-sensitized solar cell 100, the inner circumference P1 in the wide width section is positioned to be inner side than the narrow width section 4b. Therefore, as compared with the case where the inner circumference P1 in the wide width section is not positioned to be inner side than the narrow width section 4b, it is more satisfactorily prevented that a wedge-shaped narrow gap is formed by the working electrode 1 and the inner circumferential surface S of the sealing portion 4. Similarly, as compared with the case where the inner circumference P1 in the wide width section is not positioned to be inner side than the narrow width section 4b, it is also more satisfactorily prevented that a wedge-shaped narrow gap is formed by the counter electrode 2 and the inner circumferential surface S of the sealing portion 4. Therefore, detachment of the sealing portion 4 or leakage of the electrolyte 3 due to stress concentration at the gap is more satisfactorily suppressed.

Furthermore, in the dye-sensitized solar cell 100, a wiring section 11 which is an inorganic sealing section is provided on the working electrode 1 and within the sealing portion 4. For this reason, even if the sealing portion 4 is compressed as a result of the action of a stress that brings the working electrode 1 and the counter electrode 2 closer to each other, the pressure that is applied to the narrow width section 4b is not easily transferred by the wiring section 11 to the first connection section 4a that connects the interface B1 and the narrow width section 4b. Therefore, it is difficult for the inner circumferential surface S1 of the first connection section 4a to protrude to be convex toward the electrolyte 3 side, and it is difficult for a wedge-shaped narrow gap to be formed. Therefore, stress concentration at the interface B1 between the working electrode 1 and the first connection section 4a can be more satisfactorily suppressed.

Furthermore, in the dye-sensitized solar cell 100, a groove 5A is formed on the inner circumferential surface S of the sealing portion 4. For this reason, even if the sealing portion 4 is compressed as a result of the action of a stress that brings the working electrode 1 and the counter electrode 2 closer to each other, the narrow width section 4b, the first connection section 4a, and the second connection section 4b can easily protrude toward the groove 5A. That is, it is more difficult for the inner circumferential surface S1 of the first connection section 4a and the inner circumferential surface S3 of the second connection section 4c to protrude toward the electrolyte 3 side. Therefore, it is difficult for a wedge-shaped narrow gap to be formed between the inner circumferential surface S1 of the first connection section 4a and the working electrode 1, and between the inner circumferential surface S3 of the second connection section 4c and the counter electrode 2. Accordingly, stress concentration at the interface B1 between the working electrode 1 and the first connection section 4a as well as the interface B2 between the counter electrode 2 and the second connection section 4c can also be suppressed. Therefore, detachment of the sealing portion 4 from the working electrode 1 and the counter electrode 2 or destruction of the sealing portion 4, which causes leakage of the electrolyte 3, is more satisfactorily suppressed. Therefore, the dye-sensitized solar cell 100 can have superior durability as compared with the case where the groove 5A is not formed on the inner circumferential surface S of the sealing portion 4.

Furthermore, in the dye-sensitized solar cell 100, the wiring section 11 is provided on the working electrode 1 and within the sealing portion 4. Accordingly, even if stress is applied in a direction that heads for the opposite side of the electrolyte 3 in the sealing portion 4 for the reason that the dye-sensitized solar cell 100 is placed in a high temperature environment, and the electrolyte 3 expands, migration of the sealing portion 4 is satisfactorily suppressed by the wiring section 11.

Furthermore, when the dye-sensitized solar cell 100 is disposed in a high temperature environment, fluidity of the resin sealing sections 14a and 14b increases. At this time, in the case where an excessively high pressure is applied to the sealing portion 4 in the height direction, when the wiring section 11 is provided within the sealing portion 4, for example, even if the working electrode 1 is brought closer to the counter electrode 2, it can be sufficiently suppressed by the wiring section 11 that the working electrode 1 is brought into contact with the counter electrode 2, and short-circuit between the working electrode 1 and the counter electrode 2 can be sufficiently suppressed.

Furthermore, since the wiring section 11 has superior encapsulation performance than the resin sealing sections 14a and 14b, when the sealing portion 4 includes the wiring section 11, the encapsulation performance of the sealing portion 3 is further enhanced.

Next, the method for producing the dye-sensitized solar cell 100 described above will be explained.

[Preparation Step]

First, a working electrode 1 and a counter electrode 2 are prepared as follows.

(Working Electrode)

Figure 3:
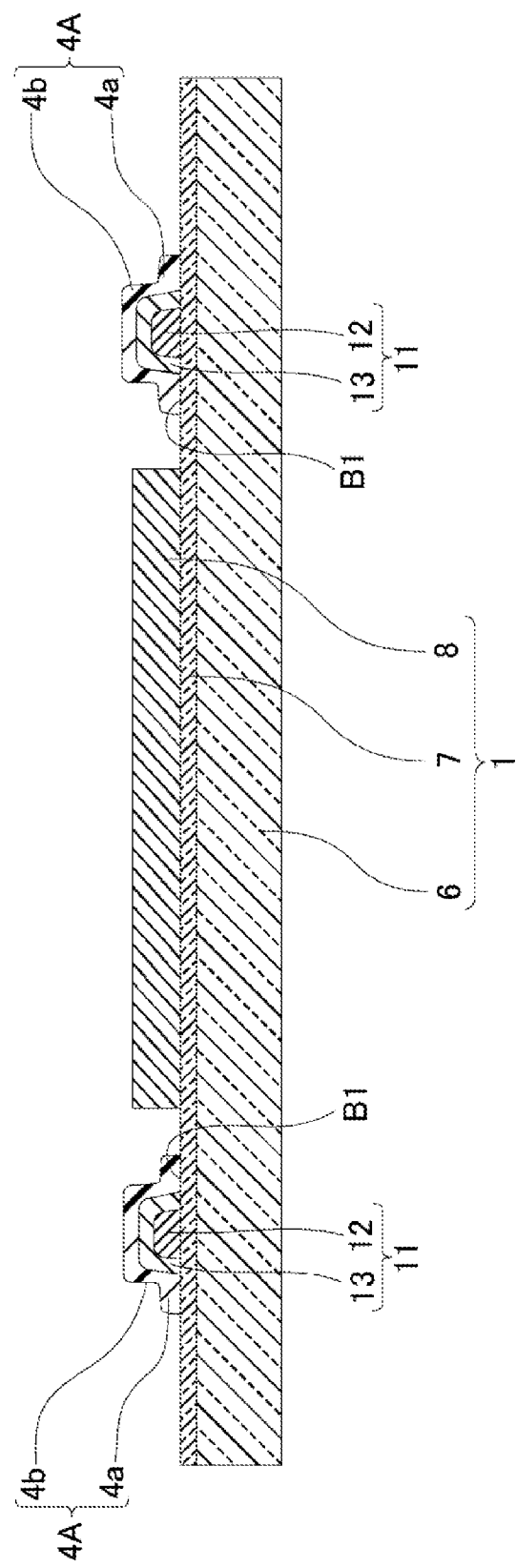
FIG. 3 is a cross-sectional diagram illustrating a preparation step of the method for producing the dye-sensitized solar cell of FIG. 1.

First, a transparent conductive electrode is produced by forming one sheet of a continuous transparent conductive film 7 on a transparent substrate 6 (FIG. 3). As the method for forming the transparent conductive film 7, a sputtering method, a vapor deposition method, a spray pyrolysis deposition method (SPD), a CVD method, or the like is used.

The material that constitutes the transparent substrate 6 may be, for example, any transparent material, and examples of such a transparent material include glasses such as borosilicate glass, soda lime glass, glass which is made of soda lime and whose iron component is less than that of ordinary soda lime glass, and quartz glass; and resin films of polyethylene terephthalate (PET), polyethylene naphthalate (PEN), polycarbonate (PC), polyether sulfone (PES), and the like. The thickness of the transparent substrate 6 is appropriately determined according to the size of the dye-sensitized solar cell 100, and there are no particular limitations. However, the thickness may be in the range of, for example, 50 µm to 10,000 µm.

Examples of the material that constitutes the transparent conductive film 7 include conductive metal oxides such as indium tin oxide (ITO), tin oxide ($SnO_2$), and fluorine-doped tin oxide (FTO). The transparent conductive film 7 may be composed of a single layer, or a laminate of plural layers formed from different conductive metal oxides. When the transparent conductive film 7 is composed of a single layer, since the transparent conductive film 7 has high heat resistance and high chemical resistance, it is preferable that the transparent conductive film 7 be formed of FTO. Furthermore, when a laminate composed of plural layers is used as the transparent conductive film 7, it is preferable because the characteristics of the various layers can be reflected. Among others, it is preferable to use a laminate of a layer formed of ITO and a layer formed of FTO. In this case, a transparent conductive film 7 having high conductivity, heat resistance and chemical resistance can be realized. The thickness of the transparent conductive film 7 may be in the range of, for example, 0.01 µm to 2 µm.

Subsequently, a wiring section 11 is formed so as to surround a region in which a porous oxide semiconductor layer 8 is prearranged to be formed (hereinafter, referred to as "region prearranged for porous oxide semiconductor layer formation"). The wiring section 11 can be obtained by forming a power collection wiring 12 so as to surround the region prearranged for porous oxide semiconductor layer formation, and subsequently forming a wiring protective layer 13 so as to cover the power collection wiring 12.

The power collection wiring 12 can be obtained by, for example, blending metal particles with a thickening agent such as polyethylene glycol into a paste, applying the paste into a coating film using a screen printing method or the like so as to surround the region prearranged for porous oxide semiconductor layer formation, and calcining the paste by heating. The wiring protective layer 13 can be obtained by, for example, applying a paste that is obtained by blending an inorganic insulating material such as low melting point glass frit with a thickening agent, a binder, a dispersant, a solvent and the like as necessary, using a screen printing method or the like so as to cover the entirety of the power collection wiring 12, and calcining the paste by heating.

Next, a paste for porous oxide semiconductor layer formation is printed in the region prearranged for porous oxide semiconductor layer formation on the surface of the transparent conductive film 7. The paste for porous oxide semiconductor layer formation contains a resin such as polyethylene glycol, and a solvent such as terpineol, in addition to oxide semiconductor particles. As the method for printing the paste for porous oxide semiconductor layer formation, for example, a screen printing method, a doctor blade method, or a bar coating method can be used.

Next, a porous oxide semiconductor layer 8 is formed by calcining the paste for porous oxide semiconductor layer formation, and thus a working electrode 1 is obtained.

The calcination temperature may vary depending on the oxide semiconductor particles, but the calcination temperature is usually 350° C. to 600° C. The calcination time may also vary depending on the oxide semiconductor particles, but the calcination time is usually 1 hour to 5 hours.

Examples of the oxide semiconductor particles include oxide semiconductor particles composed of titanium oxide ($TiO_2$), zinc oxide (ZnO), tungsten oxide ($WO_5$), niobium oxide ($Nb_2O_5$), strontium titanate ($SrTiO_5$), tin oxide ($SnO_2$), indium oxide ($In_2O_3$), zirconium oxide ($ZrO_2$), thallium oxide ($Ta_2O_5$), lanthanum oxide ($La_2O_3$), yttrium oxide ($Y_2O_3$), holmium oxide ($HO_2O_3$), bismuth oxide ($Bi_2O_3$), cerium oxide ($CeO_2$), aluminum oxide ($Al_2O_3$), or two or more kinds thereof. The average particle size of these oxide semiconductor particles is preferably 1 nm to 1000 nm, from the viewpoint that the surface area of the oxide semiconductor covered with a photosensitizing dye is increased, that is, the place for implementing photo-electric conversion is enlarged, and more numerous electrons can be generated. Here, it is preferable that the porous oxide semiconductor layer 8 be composed of a laminate formed by laminating oxide semiconductor particles having different particle size distributions. In this case, reflection of light can be caused to occur repeatedly inside the laminate, and light can be efficiently converted to electrons without letting any incident light escape to the outside of the laminate. The thickness of the porous oxide semiconductor layer 8 may be, for example, 0.5 μm to 50 μm. Meanwhile, the porous oxide semiconductor layer 8 can also be composed of a laminate of plural semiconductor layers respectively formed of different materials.

(Counter Electrode)

On the other hand, the counter electrode 2 can be obtained as follows.

Figure 4:
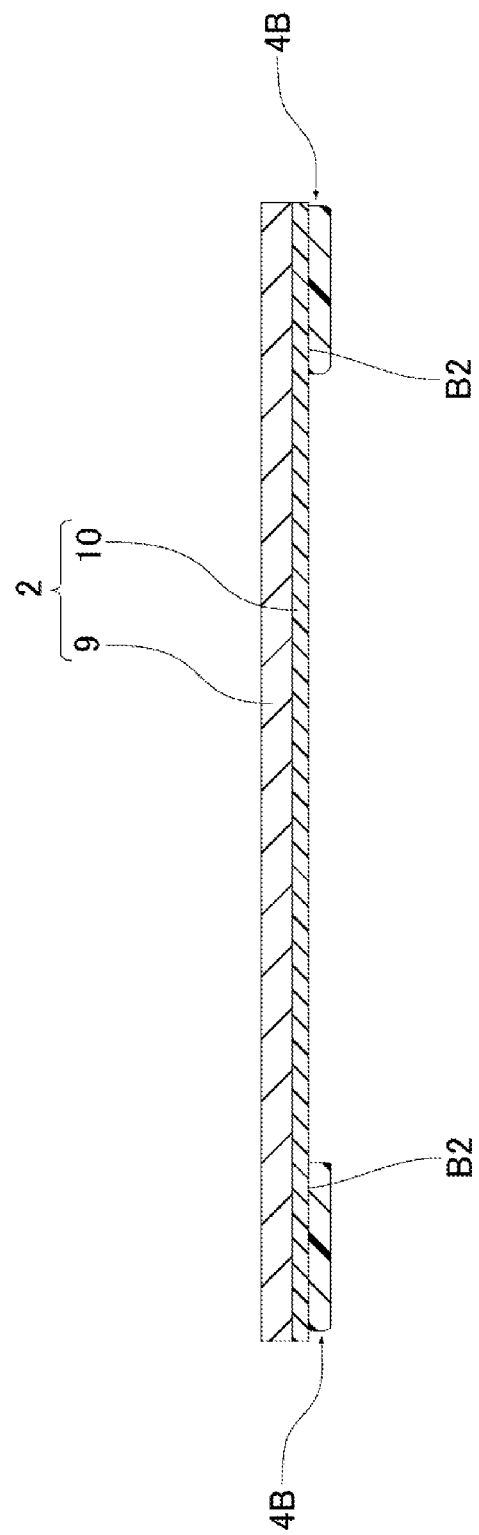
FIG. 4 is a cross-sectional diagram illustrating the preparation step of the method for producing the dye-sensitized solar cell of FIG. 1.

That is, first, a counter electrode substrate 9 is prepared (FIG. 4). Then, a catalyst layer 10 is formed on the counter electrode substrate 9. As the method for forming the catalyst layer 10, a sputtering method, a vapor deposition method or the like is used. Among these, a sputtering method is preferred in view of uniformity of the film.

At this time, the counter electrode substrate 9 is composed of, for example, titanium, nickel, stainless steel, platinum, molybdenum, tungsten, or an alloy of two or more kinds of these metals; a glass substrate; or a substrate obtained by forming a conductive oxide such as ITO or FTO on the transparent substrate 6 mentioned above. These can be used irrespective of the kind of the electrolyte 3, but particularly from the viewpoint of having corrosion resistance to iodine, these substrates are particularly suitable in the case where the electrolyte 3 contains iodine. It is preferable that among these materials, the counter electrode substrate 9 be composed of titanium from the viewpoints of corrosion resistance, price, and availability. The thickness of the counter electrode substrate 9 is appropriately determined according to the size of the dye-sensitized solar cell 100, and there are no particular limitations. However, the thickness may be, for example, 0.005 mm to 0.1 mm.

The catalyst layer 10 is composed of platinum, a carbon-based material, a conductive polymer, or the like.

[Sealing Material Fixing Step]

Next, as illustrated in FIG. 3, a first sealing material 4A is formed at the site on the wiring section 11 of the working electrode 1. The first sealing material 4A is formed to be composed of a first connection section 4a that is provided on the transparent conductive film 7 of the working electrode 1, and a narrow width section 4b that extends from the first connection section 4a. The first sealing material 4A may be formed by, for example, melting a thermoplastic resin by heating, and causing the thermoplastic resin to cover the surface of the wiring section 11, and the surface of the transparent conductive film 7 on the inside and outside of the wiring section 11.

On the other hand, as illustrated in FIG. 4, a second sealing material 4B is formed at the site on the surface of the catalyst layer 10 of the counter electrode 2. The second sealing material 4B can be obtained by, for example, melting a thermoplastic resin by heating, and bonding the thermoplastic resin to the catalyst layer 10. At this time, the sealing width of the second sealing material 4B at the interface B2 between the second sealing material 4B and the catalyst layer 10 of the counter electrode 2, is adjusted to be the same as the sealing width of the first sealing material 4A at the interface B1 between the first sealing material 4A and the transparent conductive film 7 of the working electrode 1.

As the thermoplastic resin for forming the first encapsulation section 4A and the second encapsulation section 4B, an acid-modified polyethylene, polyvinyl alcohol, an ethylene-vinyl alcohol copolymer, and the like are preferably used. In this case, it can be more satisfactorily suppressed that the electrolyte 3 penetrates into the first sealing material 4A or the second sealing material 4B and leaks. Meanwhile, the acid-modified polyethylene means a product obtained by random copolymerization, alternating copolymerization, block copolymerization, or graft copolymerization of an acid to polyethylene, or a product obtained by neutralizing the resultant with metal ions. For instance, since an ethylene-methacrylic acid copolymer is a product obtained by copolymerizing ethylene and methacrylic acid, the ethylene-methacrylic acid copolymer is an acid-modified polyethylene. An ionomer obtained by neutralizing an ethylene-methacrylic acid copolymer with metal ions is also regarded as an acid-modified polyethylene.

[Dye Supporting Step]

Next, a photosensitizing dye is supported on the porous oxide semiconductor layer 8 of the working electrode 1. For this process, the photosensitizing dye may be adsorbed to the porous oxide semiconductor layer 8 by immersing the working electrode 1 in a solution containing a photosensitizing dye, thereby adsorbing the photosensitizing dye to the porous oxide semiconductor layer 8, subsequently washing away any excess photosensitizing dye with the solvent component of the solution, and drying the porous oxide semiconductor layer 8. However, the photosensitizing dye can also be supported on plural porous oxide semiconductor layers 8 by applying a solution containing the photosensitizing dye on a porous oxide semiconductor layer 8, subsequently drying the porous oxide semiconductor layer 8, and thereby adsorbing the photosensitizing dye to the oxide semiconductor porous film.

Examples of the photosensitizing dye include ruthenium complexes having ligands containing a bipyridine structure, a terpyridine structure and the like; and organic dyes such as porphyrin, eosin, rhodamine, and merocyanine.

[Electrolyte Disposing Step]

Figure 5:
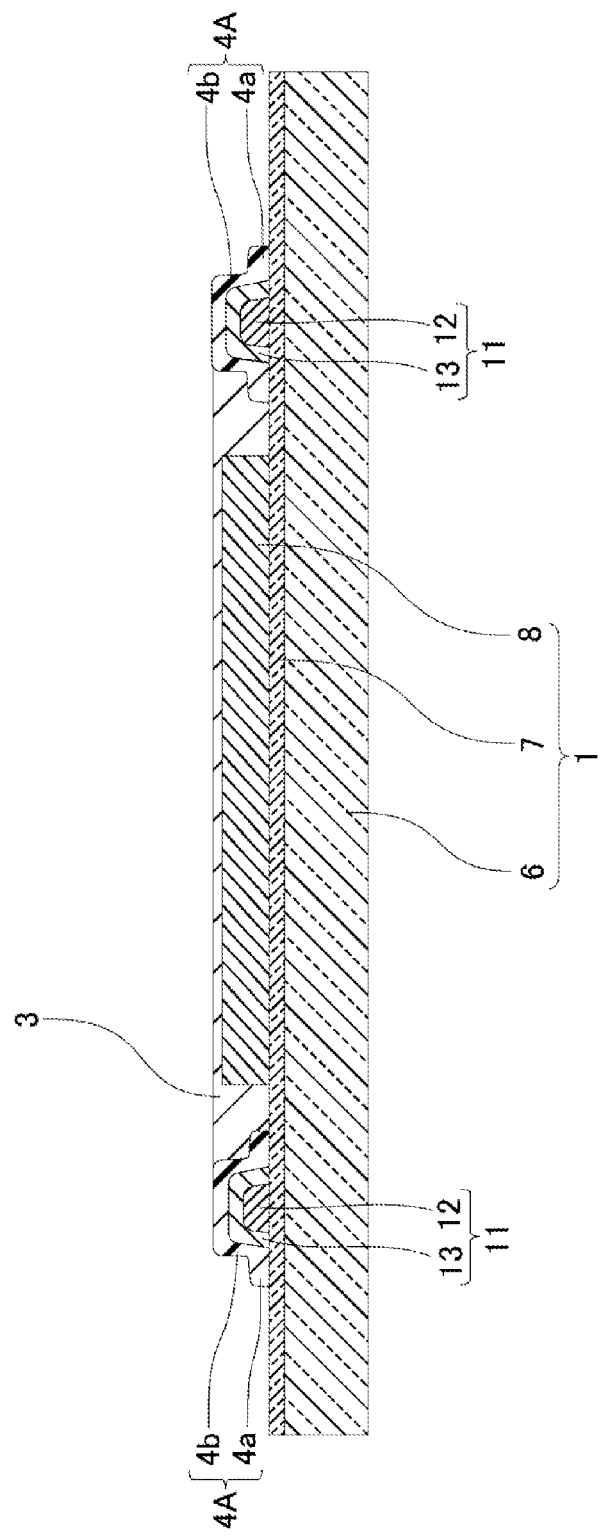
FIG. 5 is a cross-sectional diagram illustrating an electrolyte disposing step of the method for producing the dye-sensitized solar cell of FIG. 1.

Subsequently, as illustrated in FIG. 5, an electrolyte 3 is disposed on the inner side of the first sealing material 4A and on the working electrode 1. The electrolyte 3 can be obtained by injecting or printing so as to cover the porous oxide semiconductor layer 8 on the inner side of the first sealing material 4A and on the working electrode 1.

Here, when the electrolyte 3 is liquid, it is preferable to inject the electrolyte 3 into the first sealing material 4A until the electrolyte 3 overflows to the outside of the first sealing material 4A. In this case, the electrolyte 3 can be sufficiently injected into the inner side of the first sealing material 4A. Furthermore, on the occasion of forming the sealing portion 4 by adhering the first sealing material 4A and the second sealing material 4B, air can be sufficiently excluded from a cell space surrounded by the working electrode 1, the counter electrode 2 and the sealing portion 4, and the photoelectric conversion efficiency can be more satisfactorily increased. Meanwhile, even if the electrolyte 3 is injected until the electrolyte 3 runs over the first sealing material 4A and overflows to the outside of the first sealing material 4A, and thereby the adhesion site of the first sealing material 4A is wetted by the electrolyte 3, since first sealing material 4A and the second sealing material 4B are all formed of a thermoplastic resin, on the occasion of adhesion of the first sealing material 4A and the second sealing material 4B, the decrease in adhesive power caused by a decrease in wettability is sufficiently small, and the first sealing material 4A and the second sealing material 4B adhere firmly to each other.

The electrolyte 3 is usually composed of an electrolytic solution, and this electrolytic solution contains, for example, a redox couple such as $I^-/I_3^-$, and an organic solvent. Examples of the organic solvent that can be used include acetonitrile, methoxyacetonitrile, methoxypropionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenylacetonitrile, acrylonitrile, succinonitrile, oxalonitrile, pentanitrile, and adiponitrile. Examples of the redox couple include redox couples of $I^-/I_3^-$ as well as bromine/bromide ion, zinc complexes, iron complexes, and cobalt complexes. The dye-sensitized solar cell 100 is particularly effective when an electrolytic solution containing a volatile solute such as $I^-/I_3^-$ as the redox couple, and an organic solvent that is likely to volatilize at a high temperature, such as acetonitrile, methoxyacetonitrile or methoxypropionitrile, is used as the electrolyte 3. In this case, it is because the change in the internal pressure of the cell space becomes especially large due to the change in the environment temperature around the dye-sensitized solar cell 100, and the electrolyte 3 easily leaks from the interface B2 between the sealing portion 4 and the counter electrode 2, and the interface B1 between the sealing portion 4 and the working electrode 1. Meanwhile, it is also acceptable for the electrolyte 3 to contain an ionic liquid electrolyte formed of a mixture of an ionic liquid and an organic solvent as a volatile component, instead of the organic solvent described above. It is because also it this case, the change in the internal pressure of the cell space increases as a result of the change in the environment temperature around the dye-sensitized solar cell 100. Furthermore, it is also acceptable for the electrolyte 3 to contain an ionic liquid instead of the organic solvent. Examples of the ionic liquid used include iodine salts that are already known, such as a pyridinium salt, an imidazolium salt, and a triazolium salt, and normal temperature molten salts that are in a molten state at near room temperature. Examples of such normal temperature molten salts that are suitably used include 1-methyl-3-methylimidazolium iodide, 1-ethyl-3-methylimidazolium bis(trifluoromethylsulfonyl)imide, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, and methylpropylimidazolium iodide. Furthermore, the electrolyte 3 may further include additives. Examples of the additives include LiI, $I_2$, 4-t-butylpyridine, guanidium thiocyanate, 1-methylbenzimidazole, and 1-butylbenzimidazole. Furthermore, it is also acceptable to use, as the electrolyte 3, a nanocomposite gel electrolyte which is a quasi-solid electrolyte formed into a gel form by kneading nanoparticles such as $SiO_2$, $TiO_2$ or carbon nanotubes with the electrolytes described above. Furthermore, an electrolyte that has been gelled by using an organic gelling agent such as polyvinylidene fluoride, a polyethylene oxide derivative or an amino acid derivative, may also be used.

[Bonding Step]

Figure 6:
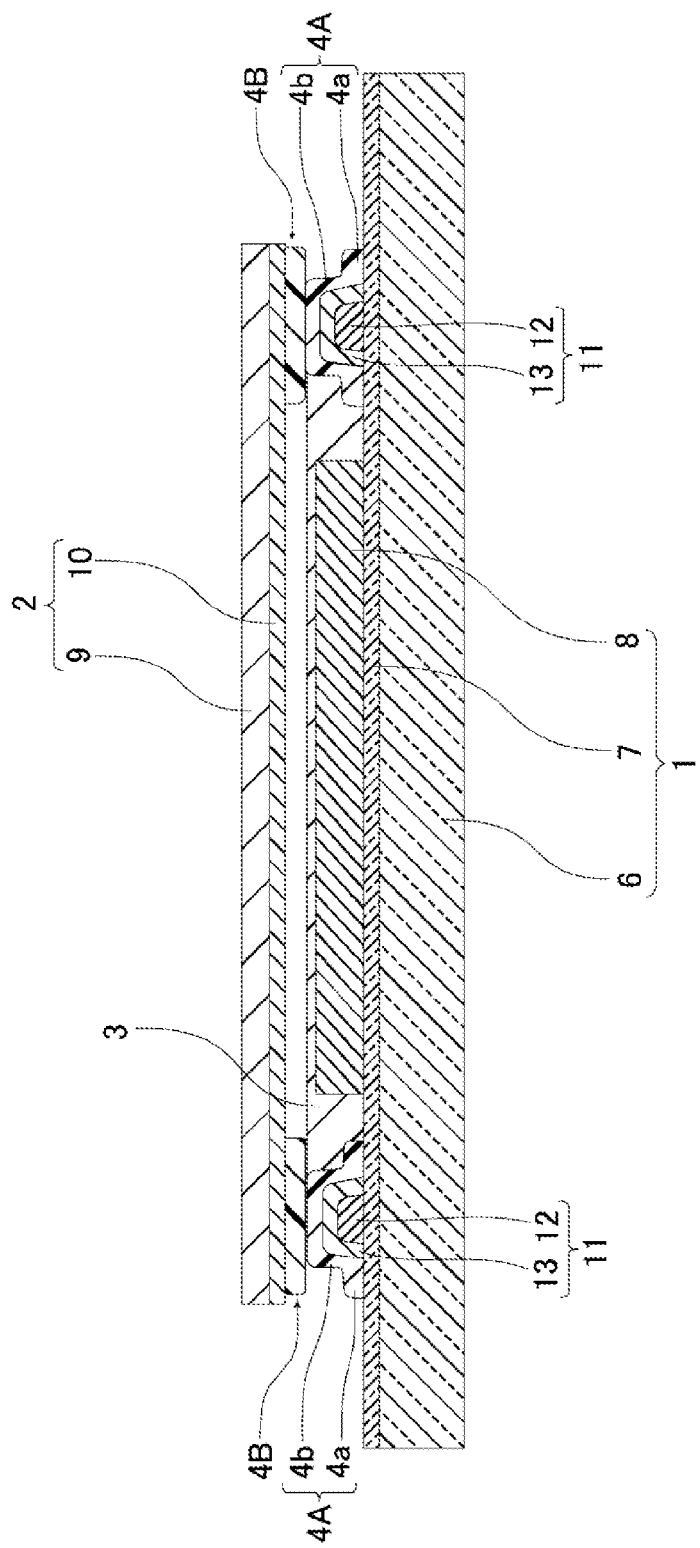
FIG. 6 is a cross-sectional diagram illustrating a bonding step of the method for producing the dye-sensitized solar cell of FIG. 1.

Next, as illustrated in FIG. 6, the working electrode 1 and the counter electrode 2 are bonded together, for example, under reduced pressure, and thus a sealing portion 4 is formed between the working electrode 1 and the counter electrode 2 (see FIG. 1).

At this time, the overlapping portion of the first sealing material 4A and the second sealing material 4B is heated while pressure is applied locally, and thus the first sealing material 4A and the second sealing material 4B are thermally melted. In this manner, the sealing portion 4 is formed (see FIG. 1).

At this time, pressurization of the first sealing material 4A and the second sealing material 4B is usually carried out at 1 MPa to 50 MPa, preferably at 2 MPa to 30 MPa, and more preferably at 3 MPa to 20 MPa.

Furthermore, the temperature at the time of melting the first sealing material 4A and the second sealing material 4B may be any temperature higher than or equal to the melting point of the thermoplastic resin that forms the first sealing material 4A and the second sealing material 4B. If the temperature is lower than the melting point of the thermoplastic resin, the thermoplastic resin that forms the first sealing material 4A and the second sealing material 4B does not melt. Therefore, the sealing portion 4 cannot be formed by adhering the first sealing material 4A with the second sealing material 4B.

However, the temperature at which the first sealing material 4A and the second sealing material 4B are melted is preferably lower than or equal to (melting point of the thermoplastic resin+200° C.). If the temperature is higher than (melting point of the thermoplastic resin+200° C.), there is a risk that the thermoplastic resin contained in the first sealing material 4A and the second sealing material 4B may be decomposed by heat.

In this manner, the dye-sensitized solar cell 100 is obtained, and thus the production of the dye-sensitized solar cell 100 is completed. Meanwhile, the preparation of the counter electrode 2 may be carried out before the counter electrode 2 and the working electrode 1 are bonded together. Therefore, when the electrolyte 3 is disposed on the working electrode 1, the preparation of the counter electrode 2 may be carried out after the disposition of the electrolyte 40 on the working electrode 1 and before bonding of the counter electrode 2 and the working electrode 1.

Figure 7:
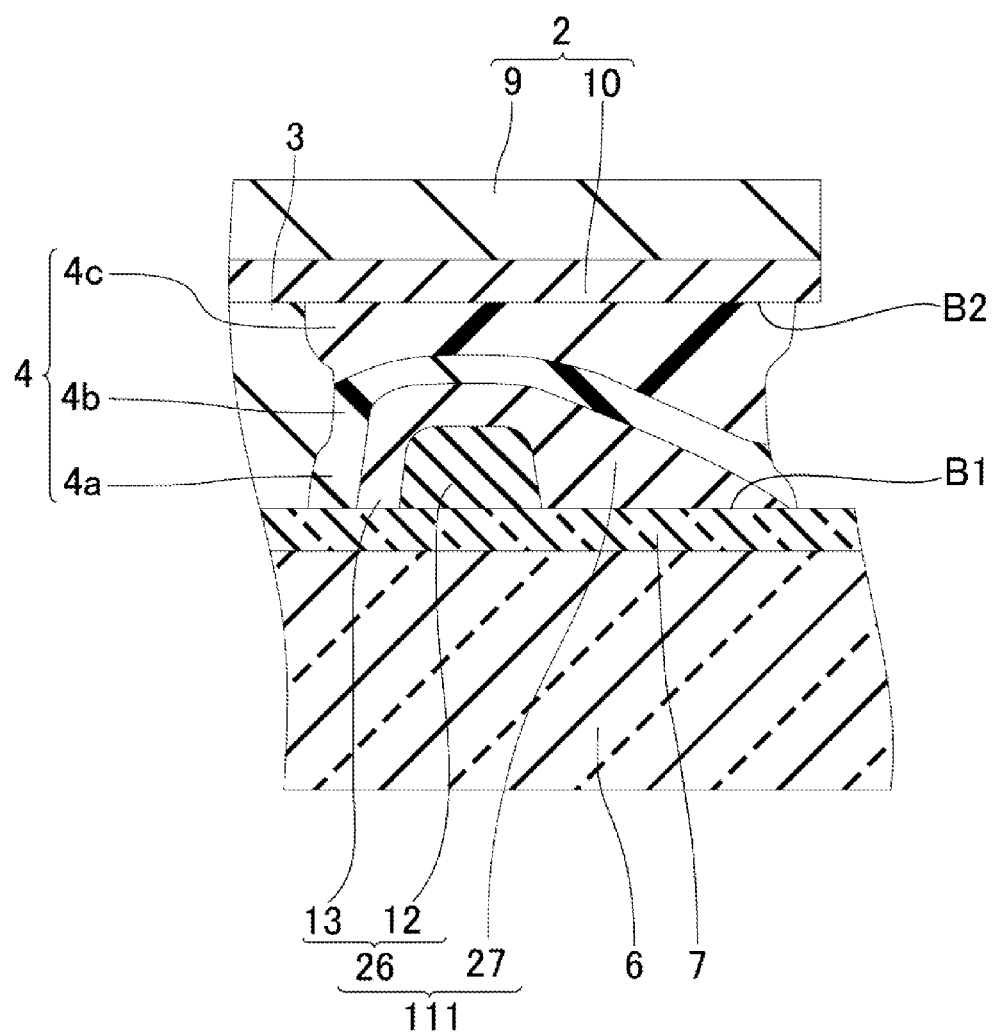
FIG. 7 is a partial cross-sectional diagram illustrating the first modification example of the sealing portion of FIG. 1.

The present invention is not intended to be limited to the embodiment described above. For example, in the above-described embodiment, the wiring section 11 is composed of the power collection wiring 12 and the wiring protective layer 13; however, as illustrated in FIG. 7, the wiring section 111 may further have, on the outside of a main body section 26 composed of the power collection wiring 12 and the wiring protective layer 13, a decreasing-thickness section 27 in which the thickness decreases as the decreasing-thickness section 27 is separated apart from the main body section 26. In this case, even if the total thickness of the resin sealing section 4b and the resin sealing section 4c between the main body section 26 and the counter electrode 2 that faces the main body section 26 is small, and adhesiveness is not sufficient, a decreasing-thickness section 27 is provided on the opposite side of the electrolyte 3 from the main body section 26. For this reason, the total thickness of the resin sealing section 4b and the resin sealing section 4c increases as being separated apart from the main body section 26. Therefore, sufficient adhesive power can be secured by the resin sealing sections 4b and 4c between the decreasing-thickness section 27 and the counter electrode 2. As a result, a dye-sensitized solar cell 100 having superior durability can be realized. Here, the decreasing-thickness section 27 means that the length from the main body section 26 to the end along the interface between the wiring section 111 and the transparent conductive film 7 is larger than the height of the main body section 26. Furthermore, the surface on the counter electrode 2 side of the decreasing-thickness section 27 may be a smooth surface, a convex surface, or a step-like form. The decreasing-thickness section 27 can be composed of, for example, the same material as that used in the wiring protective layer 13. Meanwhile, the decreasing-thickness section 27 may also be provided on the inner side of the main body section 26.

Figure 8:
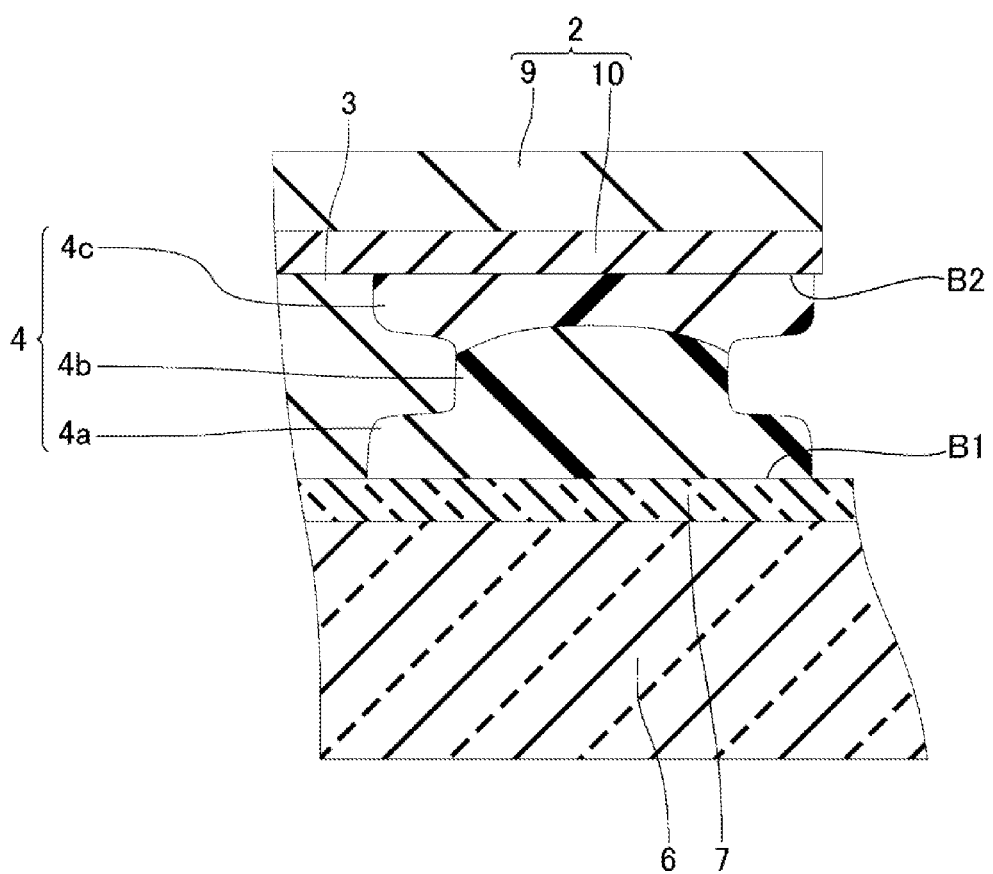
FIG. 8 is a partial cross-sectional diagram illustrating the second modification example of the sealing portion of FIG. 1.

Furthermore, in the embodiment described above, the sealing portion 4 includes the wiring section 11, but as illustrated in FIG. 8, the sealing portion 4 may not have the wiring section 11.

Furthermore, in the embodiment described above, grooves 5A and 5B are respectively formed on the inner circumferential surface S and the outer circumferential surface T of the sealing portion 4; however, the grooves 5A and 5B are not essentially necessary and can be omitted.

Figure 9:
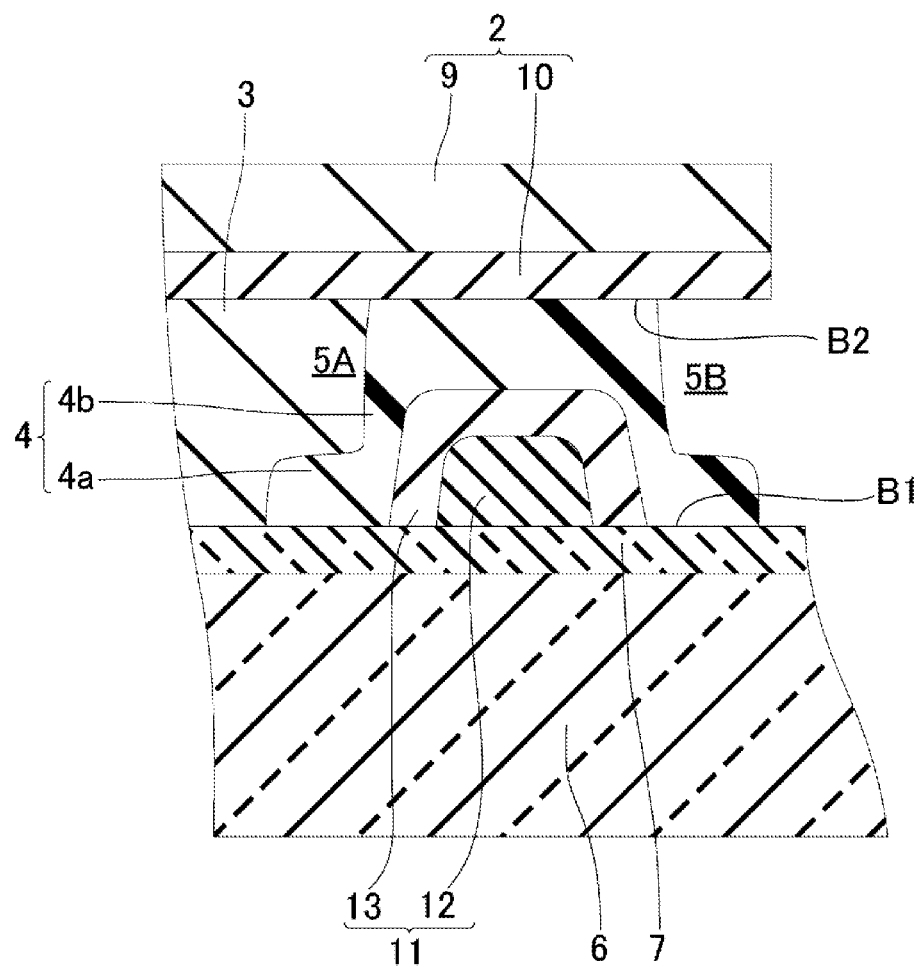
FIG. 9 is a partial cross-sectional diagram illustrating the third modification example of the sealing portion of FIG. 1.

Furthermore, in the embodiment described above, the sealing portion 4 is composed of the first connection section 4a, the narrow width section 4b, and the second connection section 4c; however, the sealing portion 4 may not have the second connection section 4c as illustrated in FIG. 9. That is, the sealing portion 4 may be composed of the first connection section 4a and the narrow width section 4b. In other words, the narrow width section 4b may be directly connected to the interface B2. In this case, between the interfaces B1 and B2, only the interface B1 constitutes the narrow width section. Furthermore, grooves 5A and 5B are formed by the counter electrode 2, the narrow width section 4b and the first connection section 4a. Furthermore, although not shown in the diagram, the sealing portion 4 may be composed of the second connection section 4c and the narrow width section 4b.

Figure 10:
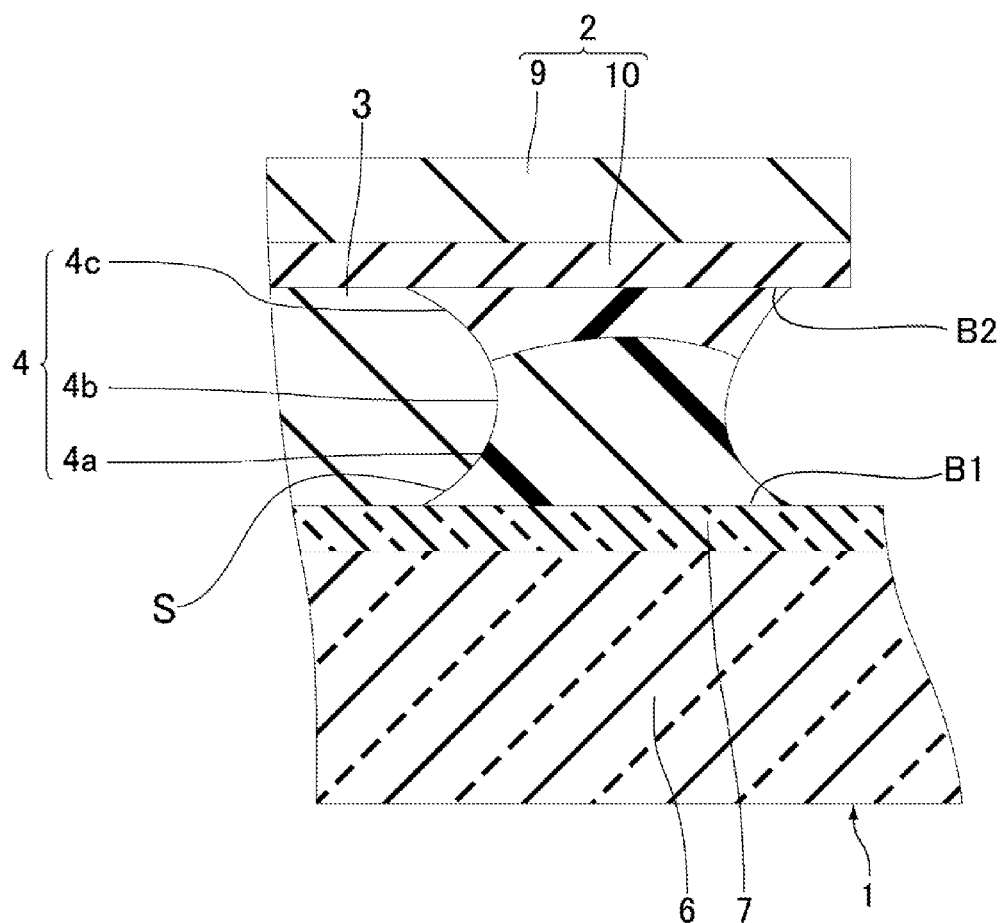
FIG. 10 is a partial cross-sectional diagram illustrating the fourth modification example of the sealing portion of FIG. 1.

Furthermore, in the embodiment described above, the sealing width of the first connection section 4a and the second connection section 4c is approximately constant along the direction that binds the working electrode 1 and the counter electrode 2. However, the sealing portion 4 may have a shape in which, as illustrated in FIG. 10, the sealing width of the first connection section 4a decreases from the interface B1 toward the narrow width section 4b, and the sealing width of the second connection section 4c also decreases from the interface B2 toward the narrow width section 4b. Thereby, it can be suppressed that the inner circumferential surface S of the sealing portion 4 protrudes to be convex toward the electrolyte 3 side. Here, the narrow width section 4b may have a constant thickness along the direction that binds the working electrode 1 and the counter electrode 2, but the thickness may also be zero. That is, the narrow width section 4b may be composed of a surface.

Moreover, in the present invention, the sealing portion 4 may not be fit in the region immediately above the wide width section. That is, when the sealing portion 4 is viewed from a direction perpendicular to the interface B1 with the working electrode 1, the interface B2 between the sealing portion 4 and the counter electrode 2 may not coincide with the interface B1.

Furthermore, in the embodiment described above, both the interface B1 between the working electrode 1 and the sealing portion 4 and the interface B2 between the counter electrode 2 and the sealing portion 4 constitute a wide width section having the broadest sealing width W1 among the sealing widths of the sealing portion 4. However, it is not necessary that both the interface B1 and the interface B2 be the wide width section, and only any one of them may be the wide width section.

EXAMPLES

Hereinafter, the contents of the present invention will be described more specifically by way of Examples and Comparative Examples, but the present invention is not intended to be limited to the Examples described below.

Example 1

First, a fluorine-doped tin oxide transparent conductive glass substrate (FTO substrate) having a size of 20 cm×20 cm×4 mm (thickness) was prepared. Subsequently, a 500° C.-sintering type silver paste was applied on the FTO substrate such that a rectangular annular pattern and a pattern for extraction that is drawn out from parts of the outer periphery of the rectangular annular pattern would be formed. At this time, the rectangular annular pattern was formed by applying the silver paste such that a quadrilateral-shaped opening having a size of 18 cm×18 cm would be formed, and the width would be 0.2 cm. Further, the silver paste constituted of the rectangular annular pattern and the pattern for extraction was calcined at 500° C., and thus power collection wiring formed of silver and having a thickness of about 10 μm was obtained.

Next, a titanium oxide paste was applied inside the rectangular annular pattern so as to have a rectangle shape at a position separated by about 1 mm from the power collection wiring, and the titanium oxide paste was calcined. Thus, a porous oxide semiconductor layer having a thickness of about 20 μm was formed.

Next, the portion of the rectangular annular pattern in the power collection wiring was covered with a low melting point glass frit, and the power collection wiring was calcined at 520° C. Thus, a wiring protective layer having a thickness of 50 µm was formed. In this manner, a working electrode was obtained.

Next, a polyolefin-based hot melt resin having a thickness of 20 µm was attached so as to cover the wiring protective layer, and also to cover the portion 0.5 mm away from the inner circumferential surface of the wiring protective layer and the portion 0.5 mm away from the outer circumferential surface of the wiring protective layer, which is also the surface of the transparent conductive film, and the hot melt resin was melt adhered. Thus, a first connection section, and a first sealing material that extended from the first connection section and constituted a narrow width section having a narrower sealing width than the interface between the first connection section and the working electrode, were formed. At this time, HIMILAN (trade name, manufactured by DuPont-Mitsui Polychemicals Co., Ltd.), which is an ionomer, was used as the polyolefin-based hot melt resin. Furthermore, the hot melt resin was disposed so as not to overlap with the porous oxide semiconductor layer.

Subsequently, the working electrode was immersed in a dehydrated ethanol liquid in which N719 dye, a photosensitizing dye, was dissolved at a concentration of 0.2 mM, for one whole day and night, and thus the photosensitizing dye was supported on the working electrode.

On the other hand, a metal substrate formed of a pure titanium metal foil and having a size of 20 cm×20 cm×40 µm (thickness) was prepared, and after the surface of this metal substrate was plasma-cleaned, a platinum catalyst layer having a thickness of about 30 nm was formed over the entire surface by a sputtering method. Thus, a counter electrode was obtained.

Next, a rectangular annular pattern formed from a polyolefin-based hot melt resin and having one quadrilateral-shaped opening (17.5 cm×17.5 cm) formed on a sheet having a size of 18 cm×18 cm, with the width being 30 mm, was prepared. Next, the polyolefin-based hot melt resin was disposed on the platinum catalyst layer of the counter electrode, and then the hot melt resin was melt adhered. Thus, a second sealing material that serves as a second connection section was formed on the counter electrode. At this time, HIMILAN was used as the polyolefin-based hot melt resin.

Next, a very small amount (about 0.01 ml) of an electrolyte was dropped in dry air at −35° C. or lower, at three points at the center, in the upper part and the lower part of the porous oxide semiconductor layer that was on the inner side of the opening of the first sealing material. At this time, a volatile electrolyte containing a volatile solvent composed of methoxyacetonitrile as a main solvent, and containing 0.1 M lithium iodide, 0.05 M iodine, and 0.5 M 4-tert-butylpyridine, was used as the electrolyte.

Then, the working electrode on which the first sealing material was provided and the counter electrode on which the second sealing material was provided were placed in a reduced-pressure environment (500 Pa), and then the first sealing material and the second sealing material were superimposed within 10 seconds. At this time, the narrow width section of the first sealing material was superimposed with the center of the second sealing material. Then, the first sealing material and the second sealing material were heated to melt at 160° C. under 3 MPa by a heater while pressure was applied thereto, and thereby a sealing portion was formed. In the sealing portion thus obtained, the sealing widths at the interface between the sealing portion and the working electrode, and the interface between the sealing portion and the counter electrode were both broadest. Also, the sealing width at the narrow width section of the sealing portion was narrower than the sealing widths at the interfaces described above. Furthermore, the inner circumference at the wide width section was positioned to be inner side than the narrow width section, and a groove was formed on the inner circumferential surface of the sealing portion, by the first connection section, the narrow width section, and the second connection section. Furthermore, the sealing width at the interface between the sealing portion and the working electrode (wide width section), and the sealing width at the interface between the sealing portion and the counter electrode (wide width section) were both 3 mm. Thus, a dye-sensitized solar cell was obtained.

Example 2

A dye-sensitized solar cell was produced in the same manner as in Example 1, except that a wiring section was not provided within the sealing portion.

In the sealing portion of the dye-sensitized solar cell thus obtained, the sealing widths at the interface between the sealing portion and the working electrode, and the interface between the sealing portion and the counter electrode were both broadest. Also, the sealing width at the narrow width section of the sealing portion was narrower than the sealing widths at the interfaces described above. Furthermore, the inner circumference at the wide width section was positioned to be inner side than the narrow width section, and a groove was formed on the inner circumferential surface of the sealing portion, by the first connection section, the narrow width section, and the second connection section.

Example 3

A dye-sensitized solar cell was produced in the same manner as in Example 1, except that a second sealing material was not fixed on the catalyst layer of the counter electrode.

In the sealing portion of the dye-sensitized solar cell thus obtained, the sealing width at the interface between the sealing portion and the working electrode was both broadest. Also, the sealing width at the narrow width section of the sealing portion was narrower than the sealing width at the interface described above. Furthermore, the inner circumference at the wide width section was positioned to be inner side than the narrow width section, and a groove was formed on the inner circumferential surface of the sealing portion, by the first connection section, the narrow width section, and the second connection section.

Example 4

A dye-sensitized solar cell was produced in the same manner as in Example 1, except that a decreasing-thickness section in which the thickness decreased as the thickness was separated apart from the main body section, was provided on the outer side of the wiring section. Meanwhile, in the decreasing-thickness section, the length from the main body section to the end along the interface between the wiring section and the transparent conductive film was set to 1 mm, and the length was arranged to be larger than the height of the main body section. Also, the surface on the counter electrode side of the decreasing-thickness section was formed in a step-like form with a step height difference of 0.05 mm.

In the sealing portion of the dye-sensitized solar cell thus obtained, the sealing widths at the interface between the sealing portion and the working electrode, and the interface between the sealing portion and the counter electrode were both broadest. Also, the sealing width at the narrow width section of the sealing portion was narrower than the sealing widths at the interfaces described above. Furthermore, the inner circumference at the wide width section was positioned to be inner side than the narrow width section, and a groove was formed on the inner circumferential surface of the sealing portion, by the first connection section, the narrow width section, and the second connection section.

Example 5

A dye-sensitized solar cell was produced in the same manner as in Example 1, except that a groove was not formed on the inner circumferential surface of the sealing portion, the inner circumferential surface was formed to be a smooth concavely curved surface, and also, a wiring section was not provided within the sealing portion.

In the sealing portion of the dye-sensitized solar cell thus obtained, the sealing widths at the interface between the sealing portion and the working electrode, and the interface between the sealing portion and the counter electrode were both broadest. Also, the sealing width at the narrow width section of the sealing portion was narrower than the sealing widths at the interfaces described above. Furthermore, the inner circumference at the wide width section was positioned to be inner side than the narrow width section.

Comparative Example 1

A dye-sensitized solar cell was produced in the same manner as in Example 1, except that when the first sealing material was fixed onto the transparent conductive film of the working electrode, a narrow width section was not formed by firmly pressing a hot melt resin against the wiring section, and the sealing portion was formed such that the sealing width at the center of the sealing portion would be larger by 0.02 mm than the sealing width at the interface between the transparent conductive film and the sealing portion.

[Evaluation on Durability]

An evaluation was carried out as follows concerning the durability of the dye-sensitized solar cells. That is, first, the photo-electric conversion efficiency after 1000 h was measured for each of the dye-sensitized solar cells obtained in Examples 1 to 5 and Comparative Example 1, and the change over time in the photo-electric conversion efficiency was calculated based on the following formula:

Change over time of photo-electric conversion efficiency=Initial photo-electric conversion efficiency (100%)−photo-electric conversion efficiency after 1000 h.

The results are presented in Table 1. Meanwhile, when the change over time of the photo-electric conversion efficiency was 10% or less, the solar cell was considered to have excellent durability and was rated as "acceptable". When the change over time was greater than 10%, the solar cell was considered to have inferior durability and was rated as "unacceptable".

TABLE 1

| | First connection section | Second connection section | Narrow width section | Wiring section (inorganic encapsulation section) | Groove on inner circumferential surface | Decreasing - thickness section | Change over time of photo-electric conversion efficiency (%) |
|---|---|---|---|---|---|---|---|
| Example 1 | Present | Present | Present | Present | Present | — | 5 |
| Example 2 | Present | Present | Present | — | Present | — | 3 |
| Example 3 | Present | — | Present | Present | Present | — | 6 |
| Example 4 | Present | Present | Present | Present | Present | Present | 0 |
| Example 5 | Present | Present | Present | — | — | — | 5 |
| Comparative Example 1 | Present | Present | — | Present | Present | — | 25 |

According to the results shown in Table 1, the dye-sensitized solar cells of Examples 1 to 5 satisfied the acceptability criteria in view of durability. On the contrary, it was found that the dye-sensitized solar cell of Comparative Example 1 did not satisfy the acceptability criteria in view of durability.

Therefore, it was confirmed that according to the present invention, a dye-sensitized solar cell having excellent durability can be realized.

EXPLANATIONS OF REFERENCE NUMERALS

1 WORKING ELECTRODE (FIRST ELECTRODE)
2 COUNTER ELECTRODE (SECOND ELECTRODE)
3 ELECTROLYTE
4 ENCAPSULATION UNIT
4a FIRST CONNECTION SECTION, CONNECTION SECTION
4b NARROW WIDTH SECTION
4c SECOND CONNECTION SECTION
4A FIRST SEALING MATERIAL
4B SECOND SEALING MATERIAL
11, 111 WIRING SECTION (INORGANIC SEALING SECTION)
12 POWER COLLECTION WIRING (INORGANIC SEALING SECTION)
13 WIRING PROTECTIVE LAYER (INORGANIC SEALING SECTION)
14a, 14b RESIN SEALING SECTION
26 MAIN BODY SECTION
27 DECREASING-THICKNESS SECTION
100 DYE-SENSITIZED SOLAR CELL
B1 INTERFACE (FIRST INTERFACE, WIDE WIDTH SECTION)
B2 INTERFACE (SECOND INTERFACE, WIDE WIDTH SECTION)
P1 INNER CIRCUMFERENCE AT WIDE WIDTH SECTION

S INNER CIRCUMFERENTIAL SURFACE OF ENCAPSULATION UNIT
W1 SEALING WIDTH OF WIDE WIDTH SECTION
W2 SEALING WIDTH OF NARROW WIDTH SECTION

The invention claimed is:

1. A dye-sensitized solar cell comprising:
a first electrode;
a second electrode that faces the first electrode;
an electrolyte that is disposed between the first electrode and the second electrode; and
a sealing portion that has an annular shape and surrounds the electrolyte together with the first electrode and the second electrode, and connects the first electrode and the second electrode,
wherein at least one interface of a first interface between the first electrode and the sealing portion, and a second interface between the second electrode and the sealing portion constitutes a wide width section having the broadest sealing width among the sealing widths of the sealing portion, and the sealing portion has a narrow width section having a narrower sealing width than the wide width section,
the sealing portion has a first resin sealing portion which is formed from a resin and is adhered to the first interface, and a second resin sealing portion which is formed from a resin and bonds the first resin sealing portion and the second interface,
an inorganic sealing section consisting of an inorganic material is provided on at least one electrode of the first electrode and the second electrode, and within the sealing portion and
the inorganic sealing section comprises a main body section that is provided on at least one of the first electrode and the second electrode, and a decreasing-thickness section that is provided on the electrolyte side or the opposite side of the electrolyte in the main body section, and the decreasing-thickness section has a thickness that decreases as the decreasing-thickness section is separated apart from the main body section, the thickness of the decreasing-thickness section being a thickness from the at least one of the first electrode and the second electrode on which the main body portion is provided.

2. The dye-sensitized solar cell according to claim 1, wherein the inner circumference at the wide width section is positioned to be inner side than the narrow width section.

3. The dye-sensitized solar cell according to claim 1, wherein the sealing portion further comprises:
a first connection section that connects between the narrow width section and the first interface; and
a second connection section that connects the narrow width section and the second interface, and
a groove is formed on the inner circumferential surface of the sealing portion by the first connection section, the narrow width section and the second connection section.

4. The dye-sensitized solar cell according to claim 1, wherein the sealing portion comprises a connection section that connects the narrow width section and the first interface, the narrow width section is directly connected to the second interface, and a groove is formed on the inner circumferential surface of the sealing portion by the connection section, the narrow width section and the second electrode.

5. A method for producing a dye-sensitized solar cell, the method comprises:

a preparation step of preparing a first electrode and a second electrode;
a sealing material fixing step of fixing a first sealing material and a second sealing material that form a sealing portion that connects the first electrode and the second electrode, to the first electrode and the second electrode by bonding the first sealing material to the first electrode and bonding the second sealing material to the second electrode;
an electrolyte disposing step of disposing an electrolyte on the first electrode or the second electrode; and
a bonding step of bonding the first electrode and the second electrode together, and forming the sealing portion containing the first sealing material and the second sealing material between the first electrode and the second electrode by bonding the first sealing material and the second sealing material,
wherein the sealing portion is formed such that at least one interface of a first interface between the first electrode and the sealing portion, and a second interface between the second electrode and the sealing portion, constitutes a wide width section having the broadest sealing width among the sealing widths of the sealing portion, the sealing portion has a narrow width section having a narrower sealing width than the wide width section,
an inorganic sealing section consisting of an inorganic material is provided on at least one electrode of the first electrode and the second electrode, and within the sealing portion; and
the inorganic sealing section comprises a main body section that is provided on at least one of the first electrode and the second electrode, and a decreasing-thickness section that is provided on the electrolyte side or the opposite side of the electrolyte in the main body section, and the decreasing-thickness section has a thickness that decreases as the decreasing-thickness section is separated apart from the main body section, the thickness of the decreasing-thickness section being a thickness from the at least one of the first electrode and the second electrode on which the main body portion is provided.

6. The method for producing a dye-sensitized solar cell according to claim 5, wherein the sealing portion is formed such that an inorganic sealing section formed of an inorganic material is provided on at least one electrode of the first electrode and the second electrode, and within the sealing portion.

7. A dye-sensitized solar cell comprising:
a first electrode;
a second electrode that faces the first electrode;
an electrolyte that is disposed between the first electrode and the second electrode; and
a sealing portion that has an annular shape and surrounds the electrolyte together with the first electrode and the second electrode, and connects the first electrode and the second electrode,
wherein at least one interface of a first interface between the first electrode and the sealing portion, and a second interface between the second electrode and the sealing portion constitutes a wide width section having the broadest sealing width among the sealing widths of the sealing portion, and the sealing portion has a narrow width section having a narrower sealing width than the wide width section, and the sealing portion has a resin sealing portion which is formed of a resin and is adhered to the first interface, the resin sealing portion being adhered directly to the second interface, an inorganic sealing section consisting of an inorganic material is provided on at least one electrode of the first electrode and the second electrode, and within the sealing portion and the inorganic sealing section comprises a main body section that is provided on at least one of the first electrode and the second electrode, and a decreasing-thickness section that is provided on the electrolyte side or the opposite side of the electrolyte in the main body section, and the decreasing-thickness section has a thickness that decreases as the decreasing-thickness section is separated apart from the main body section, the thickness of the decreasing-thickness section being a thickness from the at least one of the first electrode and the second electrode on which the main body portion is provided.

* * * * *